United States Patent [19]

Kato

[11] Patent Number: 4,730,948

[45] Date of Patent: Mar. 15, 1988

[54] METHOD AND APPARATUS FOR CONTROLLING A PRINTER

[75] Inventor: Nobuhisa Kato, Ebina, Japan

[73] Assignee: Fuji Xerox Co., Ltd., Tokyo, Japan

[21] Appl. No.: 940,659

[22] Filed: Dec. 11, 1986

[30] Foreign Application Priority Data

Dec. 11, 1985 [JP] Japan .................................... 278723

[51] Int. Cl.[4] ......................... B41J 3/20; G01D 15/10

[52] U.S. Cl. .................................. 400/120; 400/240.3

[58] Field of Search ............................ 400/120, 240.3; 346/76 PH

[56] References Cited

U.S. PATENT DOCUMENTS 4,594,597 6/1986 Liv et al. .................... 400/240.3 X 4,600,319 7/1986 Everett, Jr. .......................... 400/54

FOREIGN PATENT DOCUMENTS 192679 10/1985 Japan ............................... 400/240.3

*Primary Examiner*—Clifford D. Crowder

*Attorney, Agent, or Firm*—Finnegan, Henderson, Farabow, Garrett and Dunner

[57] ABSTRACT

A controller for an overlay printer in which an image is transferred in a plurality of superimposed layers to a recording medium removably secured on a rotatable drum subject to vibration on starting, comprising a first sensor for controlling the securing and release of the recording medium on the drum; and a second sensor for reducing vibrational influence from the start of rotatable motion of the drum and controlling printing of the image on the recording medium.

4 Claims, 3 Drawing Figures

METHOD AND APPARATUS FOR CONTROLLING A PRINTER

BACKGROUND OF THE INVENTION

The present invention relates to a controller for a printer, including a first sensor which generates a reference signal for feeding and discharging recording paper, and a second sensor which generates a reference signal for the printing operation.

A conventional controller for a printer functions so that overlay-recording a plurality of times corresponding to the number of turns of rotation of a drum is performed on recording paper as the paper is secured on the drum. The printer comprises the drum which is rotated with the recording paper secured thereon, a thermal head which performs printing in accordance with a printing signal, an ink donor film having ink layers with a plurality of colors for transfer to the recording paper, a control section for controlling the rotation of the drum, etc., a securing section for securing the recording paper on the drum, and a paper feed/discharge unit. When the recording paper secured on the drum reaches the position of the thermal head, the heaters of the thermal head are heated in response to the printing signal sent from the control section to the thermal head. This melts the ink on the ink donor film to transfer the ink to the recording paper. For color overlay-printing, the drum is rotated by one turn after printing in one color. This brings the recording paper to the position of the thermal head again, and aligns the foremost part of the next color in a proper position to print in the next color. The control is performed by detecting the position of the drum with an encoder or a sensor, which is provided in the home position of the drum. Such controlled printing is sequentially repeated to complete the color overlay-print.

Although the conventional controller employing an encoder has a high accuracy, the controller also has a high cost. Although the conventional controller employing the sensor provided in the home position of the drum is less expensive, this controller does not have a very high accuracy.

SUMMARY OF THE INVENTION

Accordingly, it is an object of the invention to increase the accuracy of an overlay printer.

It is another object of the invention of reduce the manufacturing cost of an overlay printer.

Additional objects and advantages will be obvious from the description which follows, or may be learned by practice of the invention.

To achieve the foregoing objects and advantages, the controller of the present invention is for an overlay printer in which an image is transferred in a plurality of superimposed layers to a recording medium removably secured on a rotatable drum subject to vibration on starting. The controller comprises a first sensor means that generates a signal that controls the securing and release of the recording medium on the drum; and a second sensor means that generates a signal to start printing on the recording medium in a first color so as to reduce vibrational influence from the start of rotational motion of the drum.

Preferably, the drum has a home position, and the first sensor means detects the home position of the drum and for generates a signal to control the drum for aligning the recording medium in the home position after rotation of the drum. It is also preferred that the second sensor means sense a stop position corresponding to the rotational position of the drum when vibration from the starting of the drum is at a minimum value.

Preferably, the first sensor means generates a home signal and the second sensor means generates a stop signal, and the controller also includes control means responsive to the home signal and stop signal for aligning the drum for printing one of the superimposed layers. The control means also may include means for counting the number of rotations of the drum.

The present invention was made in consideration of the above-mentioned disadvantages. Accordingly, it is an object of the present invention to provide a controller for a printer, which comprises a first sensor which generates a reference signal for feeding and discharging recording paper and a second sensor which generates a reference signal for starting the printing operation. The second sensor is located in such a position downstream of the first sensor that the vibration from starting of the drum is at a minimum value. Thereby color overlay-printing can be performed at a high accuracy and a low cost.

BRIEF DESCRIPTION OF THE DRAWINGS

The accompanying drawings, which are incorporated in and constitute a part of the specification, illustrate one embodiment of the invention, and together with the description, serve to explain the principles of the invention.

Of the drawings:

FIG. 1 (B) shows a front view of the controller; and

DETAILED DESCRIPTION OF PREFERRED EMBODIMENT

Reference now will be made in detail to the present preferred embodiment of the invention, an example of which is illustrated in the accompanying drawings.

In accordance with the invention, the controller is for an overlay printer in which an image is transferred in a plurality of superimposed layers to a recording medium removaly secured on a rotatable drum subject to vibration on starting. The controller comprises first sensor means which generates a signal to the securing and release of the recording medium on the drum; and second sensor means which generates a signal to start printing on the recording medium in a first color to reduce vibrational influence from the start of rotational motion of the drum.

Figure 1A:
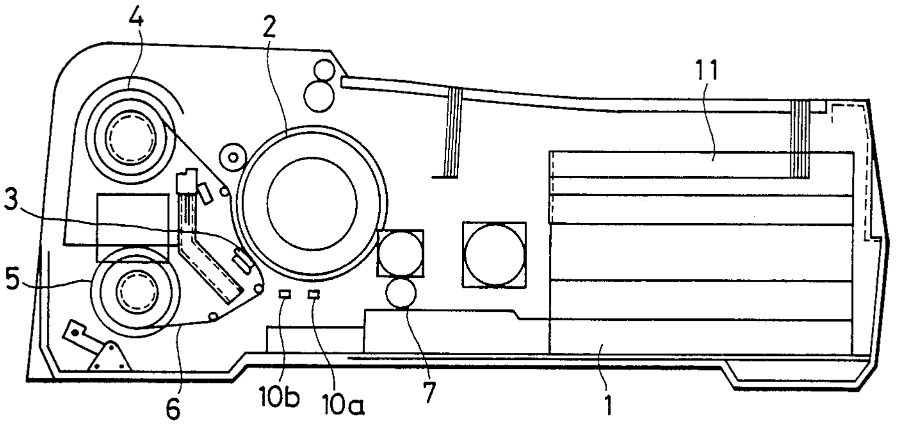
FIG. 1 (A) shows a side view of a controller for a printer, which is an embodiment of the present invention.
Figure 1B:
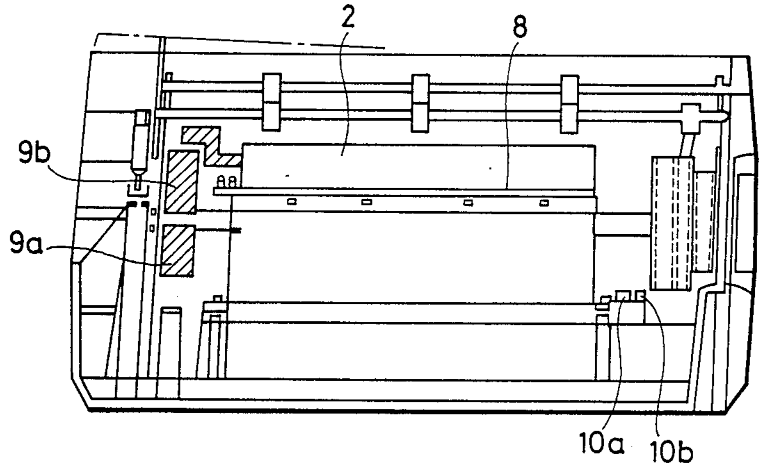

As embodied herein and shown in FIGS. 1 (A) and 1 (B), a printer includes a paper cassette 1 for feeding recording paper and a drum 2 which is rotated as the recording paper fed from the paper cassette 1 is secured on the drum. A thermal head 3 is electrically driven in accordance with a printing signal. A paper feed roller 7 feeds the recording paper and a recording paper gripping mechanism 8 secures the recording paper on the drum 2. Ungripping solenoid units **9*a* and 9*b* exert pressure on the recording paper gripping mechanism 8 to open and close it at the time of feed and discharge of the recording paper. An ink donor film 6 includes a plurality of ink layers of different color arranged in a prescribed sequence for transfer to the recording paper. An ink donor film feed roller 5 feeds the ink donor film 6, and an ink donor film winding roller 4 winds the ink donor film 6. A first sensor 10a is provided near a position in which the recording paper on the drum 2 is gripped. A second sensor 10b is provided in a position where the vibration due to rotation of the drum 2 is at a minimum after the start of the rotation. Since it is preferable that the position of the second sensor 10b not be adversely influenced by vibrations or the like caused by the operation of the solenoid units 9a and 9b for opening and closing the recording paper gripping mechanism 8, the position is set to coincide with the node of the amplitude of the vibration or the like caused by the operation of the aforesaid solenoid units 9a and 9**b.

Figure 2:
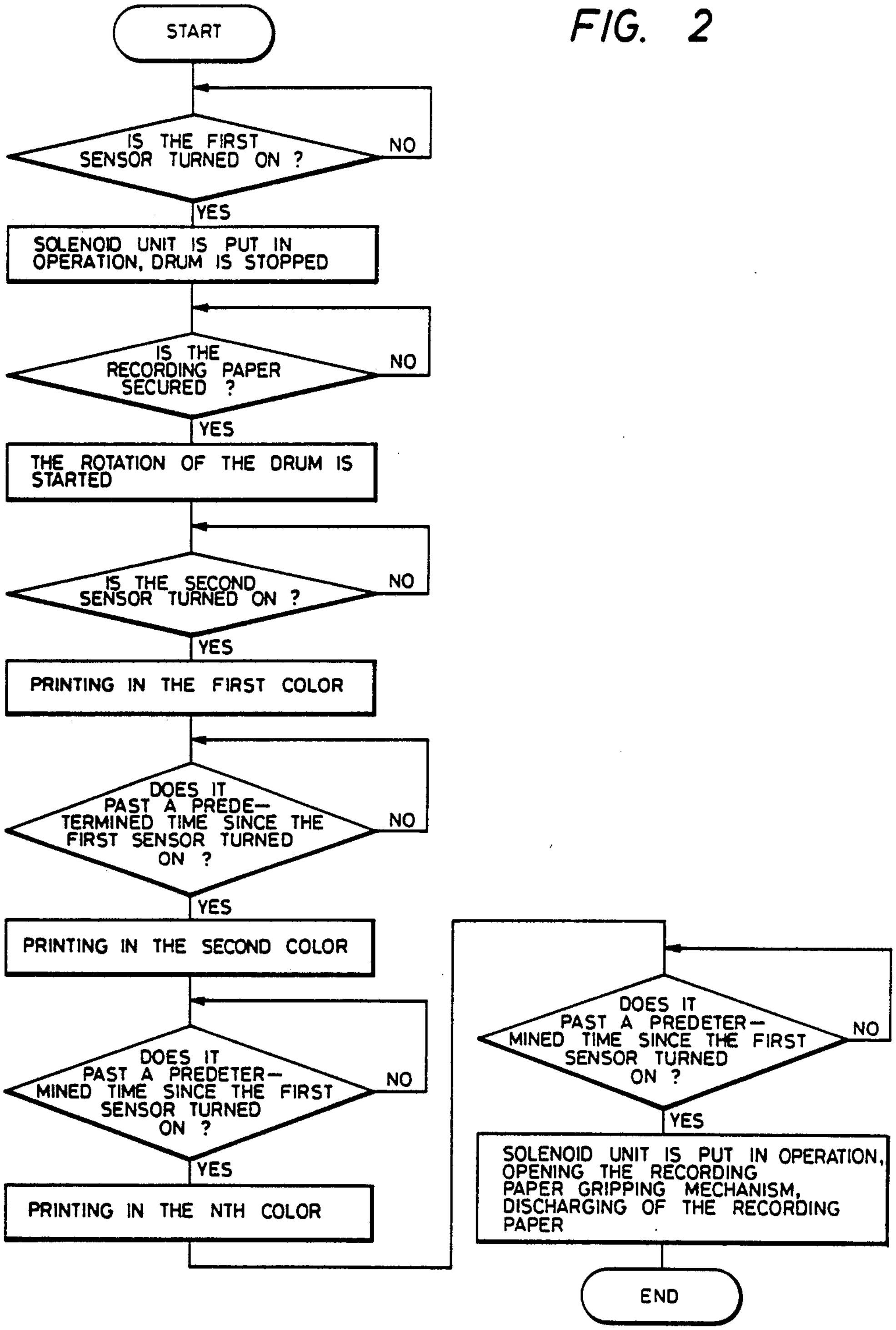
FIG. 2 shows a flow chart of operation of the controller.

The operation of the controller is hereinafter described with reference to FIG. 2, showing a flow chart. When the first sensor 10a is turned on, it detects the home position of the drum 2 and generates a reference signal corresponding to the home position. The drum 2 is then stopped in order to feed the recording paper. The point at which the ungripping solenoid unit 9a operates to open the recording paper gripping mechanism 8 is detected. When the ungripping solenoid unit 9a is activated and the drum is stopped by the action of the solenoid unit 9a being thrust against the drum 2, the recording paper supplied from the paper cassette 1 by the paper feed roller 7 is secured in a prescribed position on the drum 2 by the recording paper gripping mechanism 8. When the rotation of the drum 2 is started after the recording paper is secured thereon, the second sensor 10b is turned on. The second sensor 10b generates a reference signal corresponding to the point at which the influence of vibration or the like at the start of the rotation of the drum 2 is negligible. A control section 11 counts the number of steps taken by a step motor for rotating the drum 2 after the reference signal is generated by the second sensor 10b. When it is confirmed by the control section 11 that the starting point of printing in the first color on the recording paper has reached the position of the thermal head 3, the control section sends printing data to the thermal head 3 to apply pulses. The heaters of the thermal head 3 are thus caused to heat depending on the printing data to melt the ink on the ink donor film 6 and transfer the ink to the recording paper. Since the length of each of the ink layers arranged in the prescribed sequence of the recording paper is equal to the sum of the width of the paper and the passage length thereof, the control section 11 regulates the rotation of the drum 2 in terms of the reference signal from the first sensor 10a and number of steps taken by the step motor, so as to make the starting points of printing in the first and the second colors coincide with each other at the position of the thermal head 3. Thus, printing in the second color on the recording paper is properly performed. Such operation is repeated the same number of times as there are colors to complete all printing for one frame. The time of activation of the ungripping solenoid unit 9b for opening the recording paper gripping mechanism 8 to discharge the recording paper is determined by counting the number of steps taken by the step motor after the home position which was the point where the first sensor 10a was turned on.

Although the printing in the first color is performed on the basis of a reference signal from the second sensor 10b, and the printing in the second and other colors is performed on the basis of a reference signal from the first sensor 10a in the above-described embodiment, the printing in the second and other colors may be controlled by the reference signal from the second sensor 10b.

Various modifications and variations could be made in the invention without departing from the scope or spirit of the invention.

What is claimed is:

1. An apparatus for controlling an overlay printer in which an image is transferred in a plurality of superimposed layers of colors to a recording medium removably secured on a rotatable drum subject to vibration on starting comprising:
   - first sensor means for generating a first signal corresponding to the home position of the rotatable drum;
   - second sensor means for generating a signal when the level of vibration due to the rotation of the drum is at a minium; and
   - a controller responsive to said first signal to control the securing of the recording medium on the rotatable drum and responsive to said second signal to control the start of the transfer of the first of the plurality of superimposed layers of color.

2. The apparatus as claimed in claim 1 wherein said sensor generates a signal corresponding to the home position of the drum after rotation of the drum.

3. The apparatus as claimed in claim 1 wherein the controller further includes counting means to count the rotational steps of the drum.

4. A method for controlling an overlay printer in which an image is transferred in a plurality of superimposed layers of colors to a recording medium removably secured on a rotatable drum subject to vibration on starting rotation of the drum comprising:
   - rotating the drum;
   - detecting, with a first sensor, a home position of the drum and generating a first reference signal corresponding to said home position;
   - thrusting a solenoid unit against the drum to stop the rotation of the drum in response to said first reference signal;
   - securing recording paper on the stopped drum;
   - rotating the drum with the paper secured thereto in sequential steps with a stepping motor;
   - generating a second reference signal, with a second sensor, when vibrations due to the rotation of the drum and paper are at a predetermined minimum value;
   - printing on the recording paper in a first color in response to said second reference signal;
   - counting the number of steps taken by the stepping motor in response to said first reference signal to the start of printing in the first color;
   - printing on the recording paper in a subsequent color;
   - repeating the steps of counting the number of steps taken by the stepping motor in response to said first reference signal to the start of printing in said first color and printing on the recording paper in a subsequent color until a predetermined number of colors has been printed on said recording paper.
   - stopping the rotation of the drum after the predetermined number of colors are printed; and
   - removing the recording paper from the drum.

* * * * *